(12) United States Patent
Huang et al.

(10) Patent No.: US 7,344,290 B2
(45) Date of Patent: Mar. 18, 2008

(54) LAMP MODULE

(75) Inventors: Ming-Chung Huang, Taipei County (TW); Yu-Yang Liu, Taipei (TW)

(73) Assignee: Ledtech Electronics Corp., Taipei Hsien (TW)

( * ) Notice: Subject to any disclaimer, the term of this patent is extended or adjusted under 35 U.S.C. 154(b) by 158 days.

(21) Appl. No.: 11/162,722

(22) Filed: Sep. 20, 2005

(65) Prior Publication Data

US 2007/0064418 A1    Mar. 22, 2007

(51) Int. Cl.
*F21V 7/04*    (2006.01)
(52) U.S. Cl. .............. 362/555; 362/227; 362/240; 362/249; 362/551
(58) Field of Classification Search ........... 362/227, 362/240, 249, 551, 555
See application file for complete search history.

(56) References Cited

U.S. PATENT DOCUMENTS

2004/0012959 A1 *  1/2004  Robertson et al. .......... 362/247

* cited by examiner

*Primary Examiner*—Stephen F Husar
*Assistant Examiner*—Meghan K. Dunwiddie
(74) *Attorney, Agent, or Firm*—Rosenberg, Klein & Lee

(57) ABSTRACT

A Lamp module, which includes a metal holder frame that defines a longitudinal open chamber and transverse mounting slots across the longitudinal open chamber, LEDs that are respectively mounted in the transverse mounting slots and have a respective top metal frame fastened to the top wall of the metal holder frame for quick dissipation of heat, light guides mounted in the longitudinal open chamber of the holder frame and respectively perpendicularly attached to the LEDs, and reflectors respectively embedded in the light guides for reflecting light in one direction.

12 Claims, 6 Drawing Sheets

LAMP MODULE

BACKGROUND OF THE INVENTION

1. Field of the Invention

The present invention relates to lamps and more particularly, to a lamp module, which comprises a holder frame holding a plurality of LEDs, a plurality of light guides respectively attached to the LEDs inside the holder frame, and reflectors respectively embedded in the light guides for reflecting light from the LEDs toward a predetermined direction.

2. Description of the Related Art

The invention of lamp changes the living style of human beings. Without lamp, we cannot work at night or in the dark, and the living standard of human beings will stay in the old time level.

Commercial lighting fixtures commonly use fluorescent lamps, incandescent lamps, or the so-called power-saving lamps to give off light for illumination. These lighting fixtures have the common drawbacks of high power consumption, quick light attenuation, short service life, fragile characteristic, and being not reclaimable. Further, during the operation of a fluorescent lamp, electric current passes through the electrodes at a high frequency about 120 times per second, causing sparkling of light that is harmful to the eyes. In order to eliminate this problem, a high-frequency electronic ballast may be used. The use of a high-frequency electronic ballast in a fluorescent lamp saves power consumption and stabilizes the electric current, preventing the problem of sparkling of light. However, the high-frequency electronic ballast of a fluorescent lamp is not detachable. When the fluorescent lamp is damaged, the high-frequency electronic ballast cannot be removed from the fluorescent lamp for a repeat use. Further, because conventional fluorescent lamps have a mercury coating coated on the inside wall of the respective lamp tube, the used fluorescent lamps must be properly disposed of to prevent pollution to the environment.

SUMMARY OF THE INVENTION

The present invention has been accomplished under the circumstances in view. It is the main object of the present invention to provide a Lamp module, which has the advantages of quick reaction time, small size, low power consumption, low pollution, high brightness, and long service life. It is another object of the present invention to provide a lamp module, which is practical for home use to replace conventional electric lamps as well as for use in a light box, signboard, or backlight module. To achieve these and other objects of the present invention, the Lamp module comprises a holder frame, which has a longitudinal open chamber and at least one transverse mounting slot extending across the longitudinal open chamber; at least one light emitting diode respectively mounted in the at least one transverse mounting slot of the holder frame; at least one light guide mounted in the longitudinal open chamber of the holder frame and respectively perpendicularly attached to the at least one light emitting diode for guiding light from the at least one light emitting diode; and reflector means for reflecting light passing from the at least one light emitting diode through the at least one light guide toward a predetermined direction.

DETAILED DESCRIPTION OF THE PREFERRED EMBODIMENT

Figure 1:
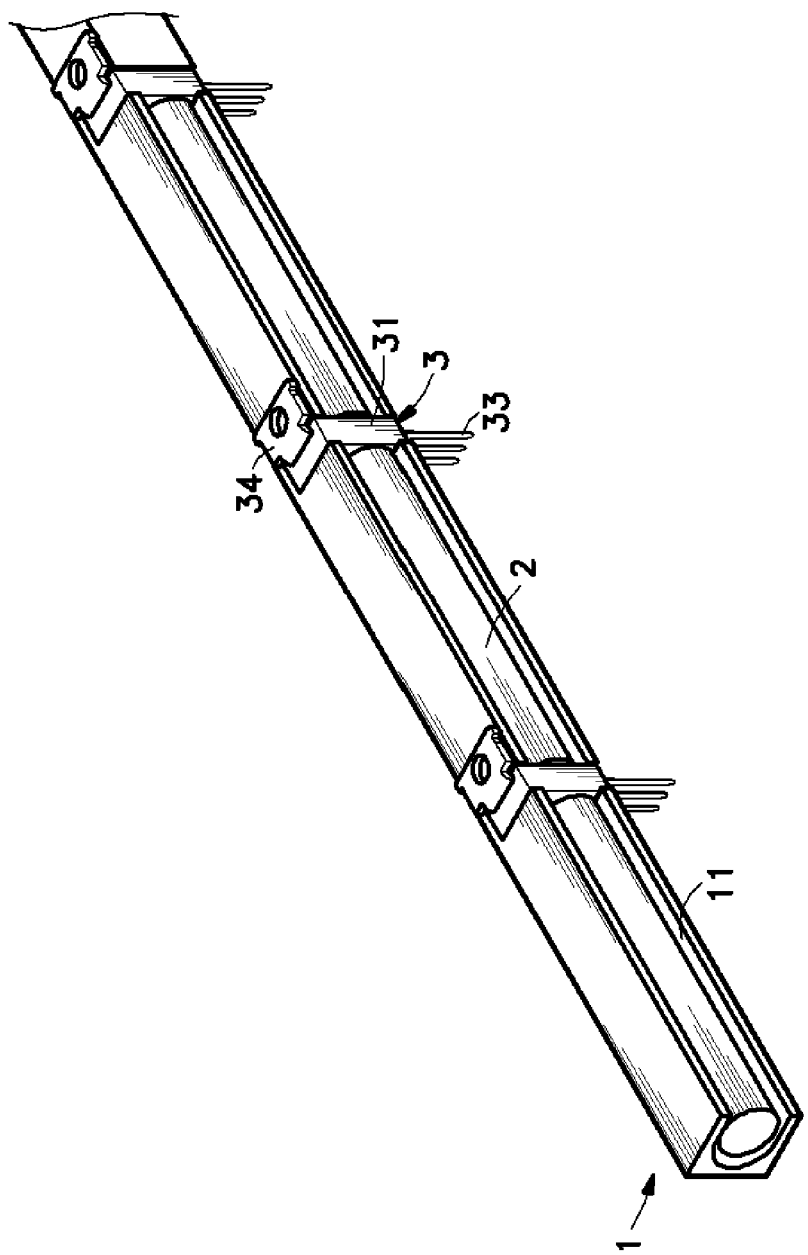
FIG. 1 is an elevational view of a Lamp module according to the present invention.
Figure 2:
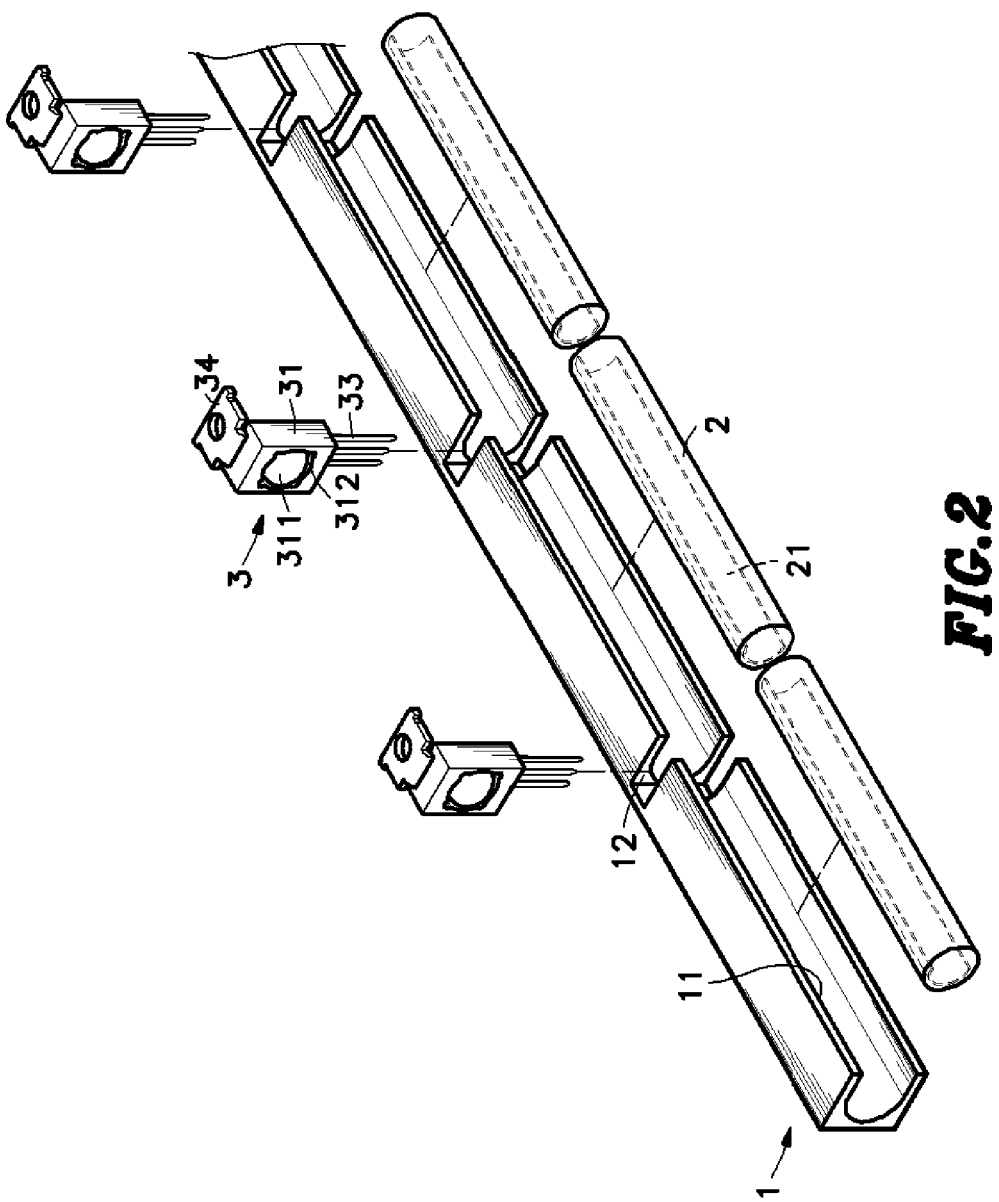
FIG. 2 is an exploded view of the Lamp module shown in FIG. 1.
Figure 3:
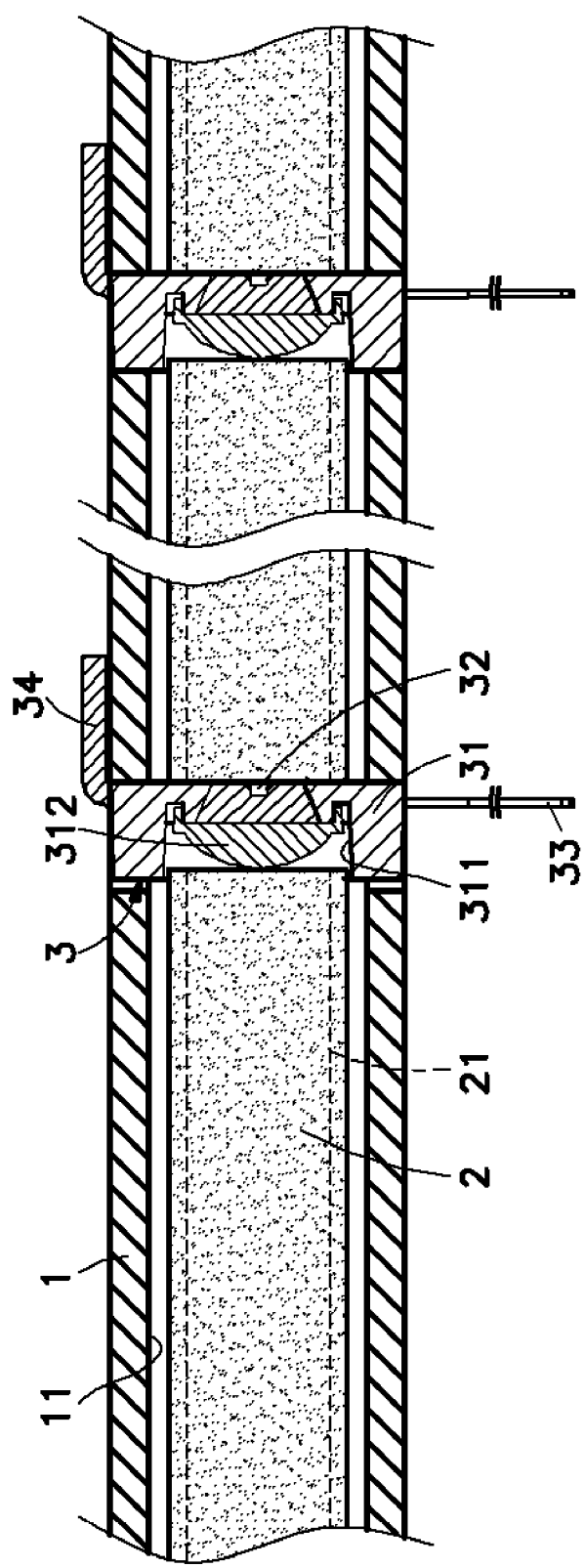
FIG. 3 is a longitudinal view in section in an enlarged scale of a part of FIG. 1.

Referring to FIGS. 1~3, a Lamp module in accordance with the present invention is show comprising a holder frame 1, light guides 2, and LEDs (light emitting diodes) 3.

The holder frame 1 according to this embodiment is a channel bar made out of copper, aluminum, alloy, or any of a variety of metal materials that have a high coefficient of transfer, defining a longitudinal open chamber 11 and a plurality of transverse mounting slots 12 that extend across the longitudinal open chamber 11.

The light guides 2 are cylindrical transparent or translucent members mounted in the longitudinal open chamber 11 of the holder frame 1 and extend along the length of the holder frame 1. Each light guide 2 has mounted therein a longitudinally extending reflector 21. The light guides 2 and the reflectors 21 may be made of two different materials. The reflectors 21 are narrow elongated light-reflecting strips, having a smoothly arched cross section.

The LEDs 3 are respectively mounted in the transverse mounting slots 12 and extend in direction perpendicular to the extending direction of the light guides 2 and the holder frame 1, each comprising a base 31 that has a recessed hole 311 disposed at one side for receiving one end of one light guide 2, a lens 312 provided inside the recessed hole 311 and disposed in close contact with the respective end of the respective light guide 2, a light emitting chip 32 embedded into the base 31 and facing the lens 312, a plurality of pins 33 respectively downwardly extending from the light emitting chip 32 to the outside of said base 31 for connection to an external circuit board (not shown), and a metal frame 34 extending out of a top side of the base 31 for fastening to the top wall of the holder frame 1 to transfer heat energy from the respective LED 3 to the holder frame 1 for quick dissipation during operation of the Lamp module. The light path of each LED 3 is in axial alignment with the respective light guide 2 so that the light of each LED 3 passes through the respective lens 312 into the respective light guide 2. The pins 33 may be inserted through respective contact through holes of the circuit board and then fixedly soldered to the circuit board. Alternatively, the pins 33 can be directly bonded to respective pads at the surface of the circuit board through a SMT (Surface Mounting Technique).

Further, the holder frame 1, the light guides 2 and the LEDs 3 are mounted together, forming a lamp module. During assembly, the light guides 2 are respectively inserted into the longitudinal open chamber 11 of the holder frame 1, and then the LEDs 3 are respectively inserted into the transverse mounting slots 12 to have the light guides 2 be respectively engaged into the recessed hole 311 of the base 31 of each of the LEDs 3 and the metal frame 34 of each of the LEDs 3 hook on the top wall of the holder frame 1. During operation of the LEDs 3, the holder frame 1 absorbs heat energy from the LEDs 3 through the metal frame 34 of each of the LEDs 3 for quick dissipation into the outside open air.

Further, during the operation of the LEDs 3, the reflectors 21 of the light guides 2 reflect light from the LEDs 3 in a particular direction through the light guides 2, enhancing the intensity of light.

Figure 2A:
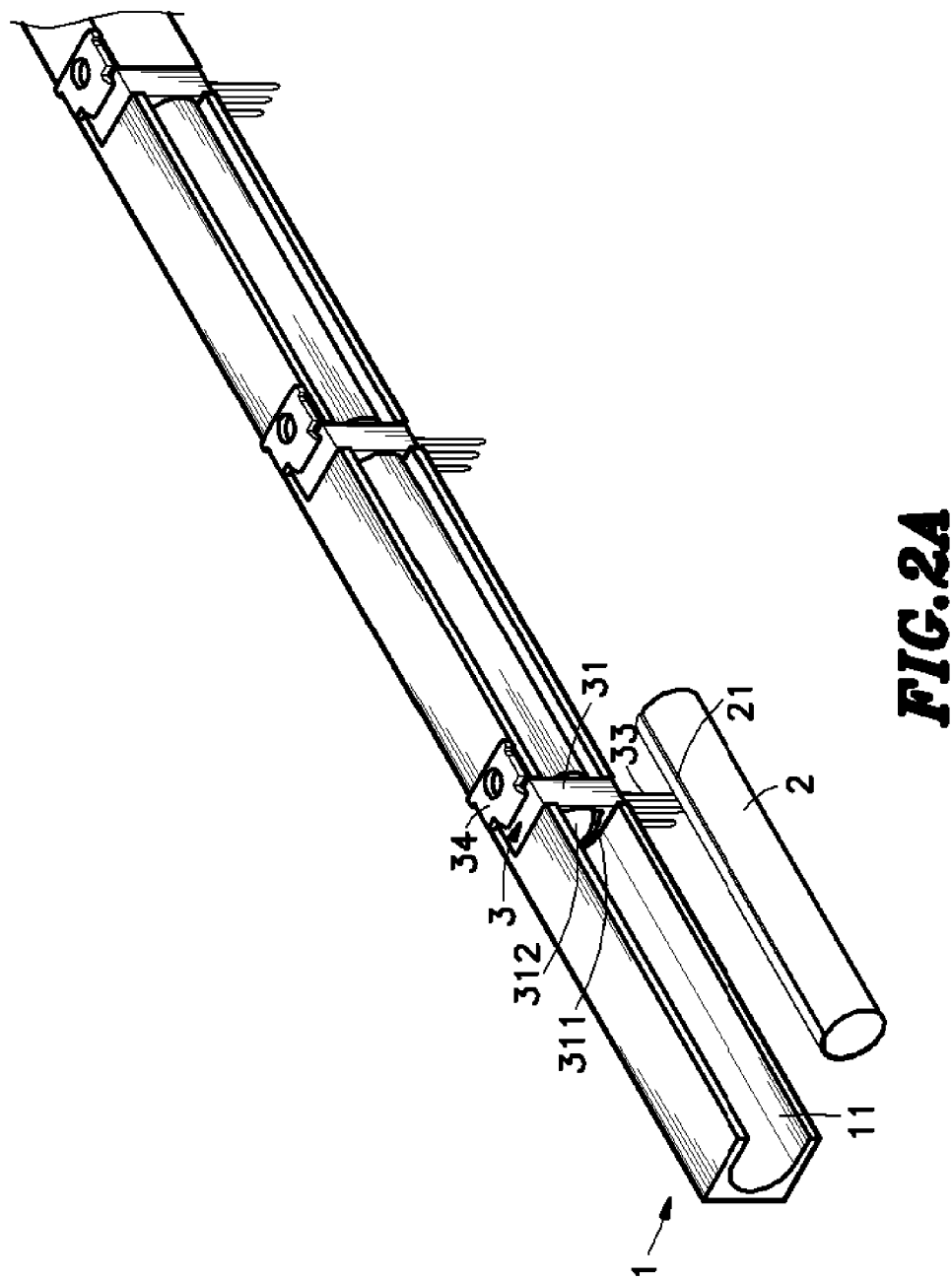
FIG. 2A is an exploded view of an alternate form of the Lamp module according to the present invention.

FIG. 2A shows an alternate form of the present invention. According to this embodiment, the reflector 21 is bonded to the periphery of the respective light guide 2.

Figure 2B:
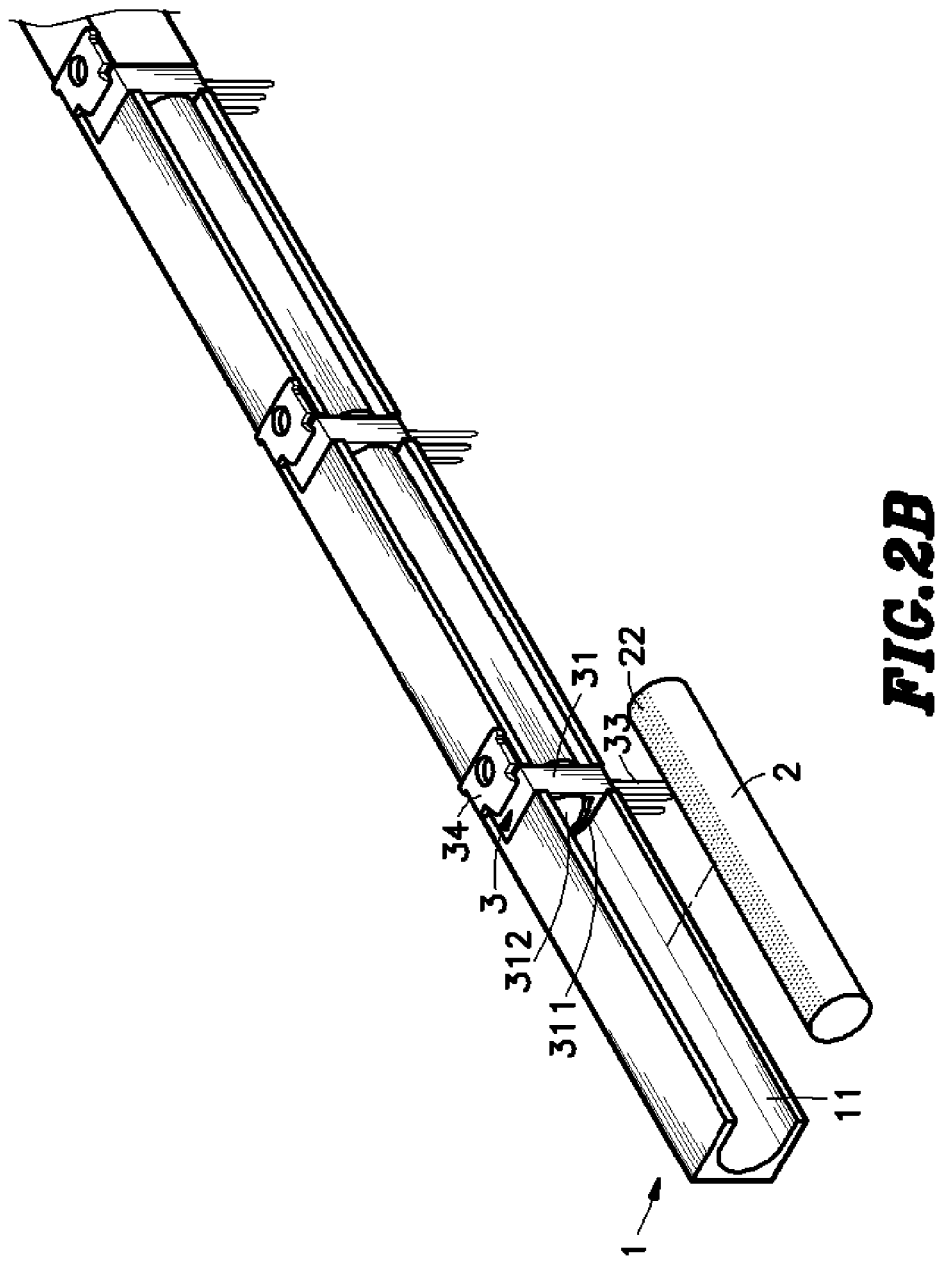
FIG. 2B is an exploded view of another alternate form of the Lamp module according to the present invention.

FIG. 2B shows another alternate form of the present invention. According to this embodiment, the aforesaid reflector 21 is eliminated, and a light reflecting material 22 is used and directly printed on the periphery of each light guide 2 to substitute for the aforesaid reflector 21. The light reflecting material 22 can be chrome powder, magnesium powder, or any of a variety of metal powders that reflect light. Alternatively, the light reflecting material 22 may be directly printed on a inside wall of the holder frame 1.

In the aforesaid embodiments, the light guides 2 are respectively attached to the LEDs 3 at one side. Alternatively, one LED 3 can be sandwiched between two light guides 2. Further, the LEDs 3 can be full-color LEDs, or high brightness LEDs of different colors.

Figure 4:
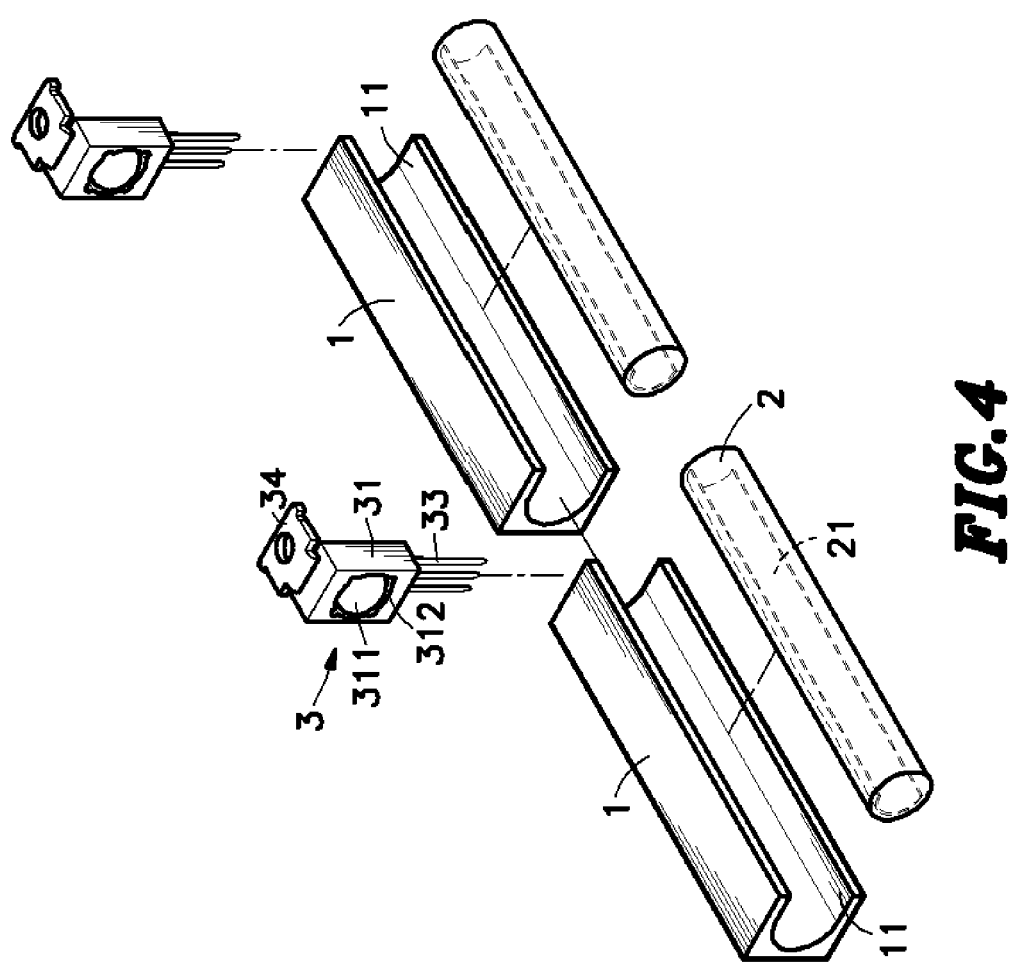
FIG. 4 is an exploded view of still another alternate form of the Lamp module according to the present invention.

FIG. 4 shows still another alternate form of the present invention. According to this embodiment, the Lamp module comprises a plurality of metal holder frames 1 arranged in a line, a plurality of light guides 2 respectively mounted in the longitudinal open chamber 11each of the metal holder frames 1, and a plurality of LEDs 3 respectively mounted in between two metal holder frames 1.

As indicated above, the invention provides a Lamp module formed of one of a number of metal holder frames 1, light guides 2 and LEDs 3, having the advantages of quick reaction time, small size, low power consumption, low pollution, high brightness, and long service life. The reflectors 21 or light reflecting material 22 reflects light in a particular direction for illumination. The use of the Lamp module to substitute conventional electric lamps eliminates the problem of sparkling due to unstable electric current. Further, the Lamp module eliminates the use of a high-frequency electronic ballast.

In actual practice, the Lamp module can be made in any of a variety of shapes for home use as well as for commercial purposes, for example, for use in a light box, signboard, or backlight module.

Although particular embodiments of the invention have been described in detail for purposes of illustration, various modifications and enhancements may be made without departing from the spirit and scope of the invention.

What is claimed is:

1. A lamp module comprising:
    a metal holder frame, said holder frame having a longitudinal open chamber and at least one transverse mounting slot extending across said longitudinal open chamber;
    at least one light emitting diode respectively mounted in said at least one transverse mounting slot of said holder frame;
    at least one light guide mounted in said longitudinal open chamber of said holder frame and respectively perpendicularly attached to said at least one light emitting diode for guiding light from said at least one light emitting diode; and
    reflector means for reflecting light passing from said at least one light emitting diode through said at least one light guide toward a predetermined direction;
    wherein the metal holder frame is made out of a metal material of high coefficient of heat transfer selected from the material group of copper, aluminum and copper alloy.

2. The lamp module as claimed in claim 1, wherein said at least one light guide is respectively made of a transparent material.

3. The lamp module as claimed in claim 1, wherein said at least one light guide is respectively made of a translucent material.

4. The lamp module as claimed in claim 1, wherein said at least one light guide and said reflector means are made of different materials.

5. The lamp module as claimed in claim 1, wherein said reflector means comprises at least one narrow elongated reflector shaped like an arched strip and respectively embedded in said at least one light guide.

6. The lamp module as claimed in claim 1, wherein said reflector means comprises at least one narrow elongated reflector shaped like an arched strip and respectively bonded to the periphery of said at least one light guide.

7. The lamp module as claimed in claim 1, wherein said reflector means is formed of a light-reflecting metal powder and directly printed on the periphery of each of said at least one light guide, said light-reflecting metal powder being selected from a group of metal powders including chrome powder and magnesium powder.

8. The lamp module as claimed in claim 1, wherein said reflector means is formed of a light-reflecting metal powder and directly printed on an inside wall of said holder frame around said longitudinal open chamber, said light-reflecting metal powder being selected from a group of metal powders including chrome powder and magnesium powder.

9. The lamp module as claimed in claim 1, wherein said at least one light emitting diode each is a full-color light emitting diode.

10. The lamp module as claimed in claim 1, wherein said at least one light emitting diode includes a number of light emitting diodes having different colors.

11. A lamp module comprising:
    a holder frame, said holder frame having a longitudinal open chamber and at least one transverse mounting slot extending across said longitudinal open chamber;
    at least one light emitting diode respectively mounted in said at least one transverse mounting slot of said holder frame;
    at least one light guide mounted in said longitudinal open chamber of said holder frame and respectively perpendicularly attached to said at least one light emitting diode for guiding light from said at least one light emitting diode; and
    reflector means for reflecting light passing from said at least one light emitting diode through said at least one light guide toward a predetermined direction;
    wherein said at least one light emitting diode each comprises a base, said base having a recessed hole at one side for receiving one end of one of said at least one light guide, a lens provided inside said recessed hole, a light-emitting chip embedded in said base for producing light toward said lens and the light guide connected to said recessed hole, a plurality of pins downwardly extending from said light-emitting chip to the outside of said base for bonding to an external circuit board, and a metal frame upwardly extending from a top side of said base for attaching to a top wall of said holder frame.

12. A lamp module comprising:
a holder frame, said holder frame having a longitudinal open chamber and at least one transverse mounting slot extending across said longitudinal open chamber;
at least one light emitting diode respectively mounted in said at least one transverse mounting slot of said holder frame;
at least one light guide mounted in said longitudinal open chamber of said holder frame and respectively perpendicularly attached to said at least one light emitting diode for guiding light from said at least one light emitting diode; and
reflector means for reflecting light passing from said at least one light emitting diode through said at least one light guide toward a predetermined direction;
wherein said at least one light emitting diode each is respectively sandwiched between two of said at least one light guides.

* * * * *